Oct. 12, 1948.    L. H. LEMKE    2,451,229
LOG BARKING DRUM
Filed Sept. 4, 1944
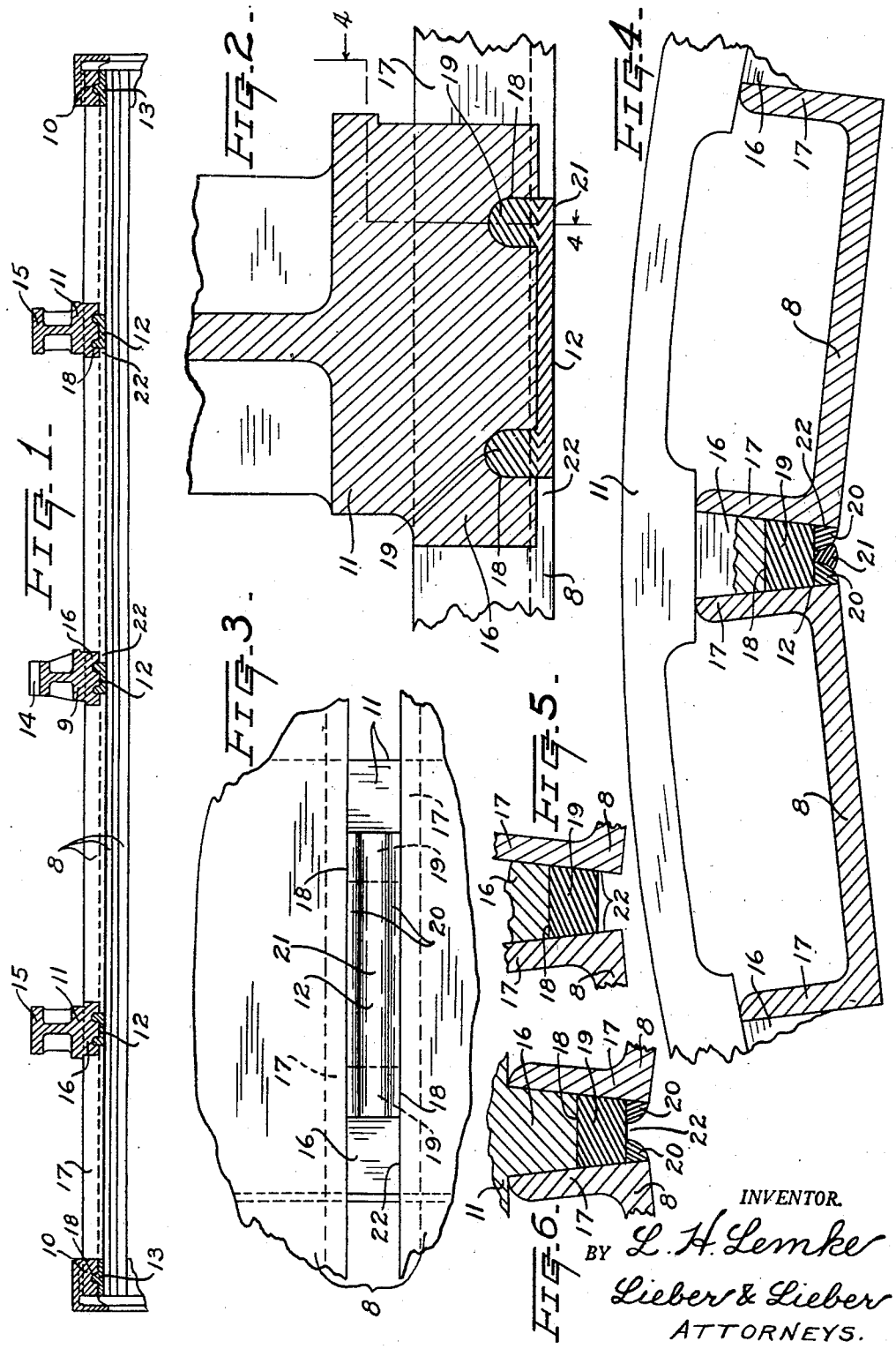
INVENTOR.
BY L. H. Lemke
Lieber & Lieber
ATTORNEYS.

Patented Oct. 12, 1948

2,451,229

UNITED STATES PATENT OFFICE 2,451,229

LOG BARKING DRUM

Lawrence H. Lemke, Wausau, Wis., assignor to D. J. Murray Manufacturing Co., Wausau, Wis., a corporation of Wisconsin Application September 4, 1944, Serial No. 552,675

2 Claims. (Cl. 189—36)

This invention relates generally to improvements in the art of bark removal, and relates more specifically to improvements in the construction and operation of barker drums for removing bark from logs.

The primary object of my invention is to provide an improved barking drum assemblage of exceptionally durable construction, and a new mode of assembling and uniting the parts of such drums.

It has long been customary in the paper manufacturing industry to utilize so-called barking drums to remove the bark from pulp wood logs, and these drums ordinarily consist of an annular series of elongated parallel bars interconnected by means of a number of outer rings which coact with driving gearing and supporting structure for effecting rotation of the drum about the axis of annularity of the bar series. In one of the most successful of these prior barking drums, the outer rings were provided with inwardly projecting integral spaced radial lugs, and channel bars were snugly interposed between the successive lugs with their side flanges directed outwardly, and the flanges of the successive channel bars were firmly attached to the intervening driving and supporting ring lugs by means of bolts or rivets piercing the channel flanges and the interposed lugs. Since these barking drums are constantly subjected to extreme and violent impact during normal operation due to the cascading of the logs therein, the connecting rivets or bolts heretofore used would frequently become loose thus necessitating many repairs and delays in operation, thereby resulting in high maintenance costs. While some attempts at welding the bars to the rings in barking drums of this general type, have heretofore been made, these prior welded assemblages have not been commercially satisfactory due to improper location, formation and application of the welds which resulted in the production of destructive vibrations in the bars and rapid deterioration of the drums, so that the demand for a sufficiently durable barking drum structure has long been acute.

It is therefore a more specific object of the present invention to provide an improved log barking drum assemblage and an improved method of welding the parts thereof to each other, whereby the life of these structures is prolonged to the utmost, and the maintenance costs are minimized.

Another specific object of this invention is to provide an improved welded barking drum structure, wherein an annular series of parallel channel bars is firmly but resiliently connected to the internal integral lugs of several embracing rings in a manner which effectively prevents disruption and deterioration of the assemblage due to vibration.

Still another specific object of the invention is to provide a new and more effective mode of interconnecting the bars and rings of a barking drum or the like, so as to provide a most durable final assemblage.

These and other objects and advantages of the invention will be apparent from the following detailed description.

A clear conception of the features constituting my present improvement, and of the mode of constructing and welding barking drum assemblages in accordance with the invention, may be had by referring to the drawing accompanying and forming a part of this specification wherein like reference characters designate the same or similar parts in the various views.

Fig. 1 is a longitudinal section through a fragment of a typical barking drum assemblage, the section having been taken through the drum retaining, supporting and driving rings along a plane disposed radially of the central drum axis;

Fig. 2 is an enlarged section similar to that of Fig. 1, taken through one of the supporting rings or tires, and through one of the improved welds for connecting the ring to the adjacent bars;

Fig. 3 is a similarly enlarged inside view of a fragment of the barking drum, looking outwardly thereof toward one of the improved welds;

Fig. 4 is a likewise enlarged transverse section through several of the channel bars and portion of one of the ring lugs and the adjacent completed weld, taken along the line 4—4 of Fig. 2, and also showing a fragment of one of the rings;

Fig. 5 is a fragmentary similarly enlarged transverse section through one of the improved welds, showing the first step in the production thereof; and Fig. 6 is a view similar to that of Fig. 5, but also showing the first and second steps involved in the production of my improved welds.

While the invention has been shown and described herein as having been applied to a typical log barking drum having five external rings provided with integral internal lugs coacting with channel shaped bars, it is not my desire or intent to thereby unnecessarily limit or restrict the scope or utility of the improvement.

Referring to the drawing, the typical log barking drum shown therein comprises in general, an annular series of elongated parallel channel shaped bars 8; and a series of five coaxial parallel rings 9, 10, 11 embracing the annular bar series and being firmly attached thereto by local welds 12, 13, see Fig. 1. The bars 8 may be formed of standard metal channel stock and are of equal length and width; and the central ring 9 is a driving ring provided with peripheral gear teeth 14, while the opposite end rings 10 are merely retainers and protectors for the extreme bar ends, and the intermediate rings 11 are drum supporting rings provided with peripheral tires 15. Each of the rings 9, 10, 11 is provided with a series of equally spaced inwardly extending integral lugs 16 which are slightly tapered and spaced apart just sufficient distances for the snug reception of the opposite side flanges 17 of the bars 8, and the lugs 16 are of less depth than the heights of the adjacent channel flanges 17, as clearly shown in Figs. 2 to 6 inclusive.

The mode of producing, locating and forming the individual welds 12, 13 is of importance in order to cause the drum structure to effectively absorb or disperse the impact and resultant vibration to which it is subjected during normal use, and these welds 12, 13 are therefore preferably applied as follows. Each of the integral inner lugs 16 associated with the embracing rings 9, 11 is provided with two relatively deep transverse recesses 18 spanning the lug 16 inwardly of its opposite end surfaces; and each lug 16 of each end ring 10 is provided with a similar central transverse recess 18. After the channel bars 8 have been driven or rammed into the spaces between alined sets of lugs 16 as indicated in Figs. 4, 5, 6, they may be tack-welded so as to temporarily hold them in place, whereupon the transverse recesses 18 should be filled with welding stock or initial welds 19 as illustrated in Fig. 5, thus firmly permanently uniting the adjacent channel flanges 17 and the intervening lugs 16 at local places spaced from each other and from the extreme ends of the lugs. After the welds 19 have been applied, they should be thoroughly peened so as to condense the initial welding material and the outer faces of these welds 19 should then be approximately flush with the innermost plane faces of the lugs 16.

When the transverse bar welds 19 have been properly applied and peened, two fillet welds 20 should be built up within the corners of the grooves 22 formed by the coacting channel bars 8 and intervening lugs 16, as depicted in Fig. 6, and these fillet welds 20 should span only the space between the two recesses 18 at the rings 9, 11, but may be caused to completely span the corresponding grooves 22 at the end rings 10, see Fig. 1. The fillet welds 20 should also be thoroughly peened, whereupon each composite weld 12, 13 may be finally completed as shown in Figs. 1 to 4 inclusive, by applying final central welds 21 in the grooves 22 between the fillet welds 20, and by thereafter peening the final welds 21.

In this manner, the individual channel bars 8 are firmly but resiliently and not rigidly connected to the adjacent lugs 16 of the various rings 9, 10, 11 by means of triple pass welds 19, 20, 21 which ultimately produce the completed welds 12, 13. While the end welds 13 may or may not completely fill the grooves 22 formed by the channel bars 8 at the inner ends of the lugs 16, it is important that the welds 12 which are adjacent to the rings 9, 11, do not fill the corresponding grooves 22. It has been found, that if the bars 8 are rigidly attached by welding to the central and intermediate rings 9, 11 at the extreme opposite faces of these rings, the portions of the bars between the successive rings will vibrate about these rigid welded connections, and this vibration soon disrupts both the bars and the welds. By confining the welds 12 to the central portions of the grooves 22 at each ring 9, 11, a flexible or resilient connecting portion is provided between each bar 8 and ring 9, 11 on the opposite sides of each weld 12, and these resilient connecting portions effectively absorb the otherwise destructive vibrations and thus prevent cracking of the bars and welds. The transverse bar welds 19 are located closely adjacent to the channel bar webs and thus effectively replace the bolts and rivets formerly used in drum assemblages of this type, and the portions of the channel bars 8 which are located between the spaced lugs 16 outwardly beyond each pair of the bar welds 19 are snugly frictionally confined in the spaces between the lugs, while the fillet welds 20 and the central welds 21 cooperate with the initial welds 19 to provide effective final composite welds 12 located entirely within the grooves 22. Undesirable internal projections extending into the completed barking drum, are thus avoided, and the welds 12, 13 are protected during normal operation of the assemblage.

From the foregoing detailed description it will be apparent that the present invention provides a new and highly useful welded barking drum assemblage, which is extremely simple and durable in construction, and which is moreover highly efficient in operation. The drum is normally rotatably supported upon lower rollers coacting with the tires 15 and may be driven by a pinion coacting with the gear teeth 14, while the end rings 10 protect the ends of the bars 8 and the spaces between the successive bars 8 provide escape openings for the bark removed from the logs which cascade over each other within the revolving drum. While only a limited number of rings 9, 11 have been shown, this number may be increased depending upon the length of the logs to be treated and upon the strength required, and the drums may be made of any desired diameter. My improved method of positioning and of applying the new welds is in fact a highly satisfactory and a more durable substitute for the prior bolted and riveted similar drum assemblages, and also obviates the difficulties heretofore encountered with previous welding methods. The specific formation and location of the welds 12 provides a most effective attachment between the bars 8 and the rings 9, 11 and entirely eliminates the destructive effects of vibration, thereby providing a structure wherein maintenance costs are reduced to a minimum.

It should be understood that it is not my desire to limit the present invention to the exact steps of the method or to the precise details of construction, herein described and illustrated, for various modifications within the scope of the appended claims may occur to persons skilled in the art.

I claim:

1. In a barking drum, an annular series of elongated parallel channel bars each having outwardly directed integral opposite parallel flanges, a ring surrounding said bar series and having inwardly directed integral radial tapered lugs extending between and snugly engaging the outer side surfaces of the adjacent bar flanges but terminating short of the innermost flange edges to provide grooves between the successive bars spanning the inner ends of said lugs, each of said lugs having therein a pair of relatively deep recesses opening into the adjacent groove a considerable distance inwardly of the opposite sides of the lug and spanning the space between the adjacent bar flanges, and a weld substantially filling the medial portion of each groove and the adjoining recesses, each of said welds terminating at the outer sides of the corresponding pair of transverse recesses so as to leave the opposite ends of each groove unoccupied.

2. In a barking drum, a pair of elongated parallel channel bars having relatively inclined outwardly directed adjacent parallel flanges, a ring having an inwardly directed integral radial tapered lug extending between and snugly engaging the outer side surfaces of said bar flanges but terminating short of the innermost flange edges to provide a groove between the bars spanning the inner end of said lug, said lug having therein a pair of relatively deep recesses opening into said groove a considerable distance inwardly of the opposite sides of the lug and spanning the space between said bar flanges, and a weld substantially filling the medial portion of said groove and the adjoining recesses but terminating at the outer sides of the recesses so as to leave the opposite ends of the groove unoccupied.

LAWRENCE H. LEMKE.

REFERENCES CITED

The following references are of record in the file of this patent:

UNITED STATES PATENTS

| Number | Name | Date |
|---|---|---|
| 1,672,300 | Branch | June 5, 1928 |
| 2,163,209 | Pungel | June 20, 1939 |
| 2,208,004 | Koebke | July 16, 1940 |
| 2,337,404 | Newton | Dec. 21, 1943 |

FOREIGN PATENTS

| Number | Country | Date |
|---|---|---|
| 497,356 | Great Britain | Dec. 19, 1938 |
| 527,223 | Great Britain | Oct. 4, 1940 |

OTHER REFERENCES

Page 514 of "The Welding Encyclopedia," by Stuart Plumley, 9th edit., re-edited 1938, on file in Division 14.